Nov. 7, 1933.　　　D. HOPPENSTAND　　　1,933,908
GEAR SHIFTING MECHANISM
Filed March 7, 1932　　　4 Sheets-Sheet 1

INVENTOR
DAVID HOPPENSTAND
BY
Cook & Robinson
ATTORNEY

Nov. 7, 1933.    D. HOPPENSTAND    1,933,908
GEAR SHIFTING MECHANISM
Filed March 7, 1932    4 Sheets-Sheet 2

INVENTOR
DAVID HOPPENSTAND
BY
Cook & Robinson
ATTORNEY

Nov. 7, 1933.  D. HOPPENSTAND  1,933,908
GEAR SHIFTING MECHANISM
Filed March 7, 1932   4 Sheets-Sheet 3

INVENTOR
DAVID HOPPENSTAND
BY
Cook & Robinson
ATTORNEY

Nov. 7, 1933.   D. HOPPENSTAND   1,933,908
GEAR SHIFTING MECHANISM
Filed March 7, 1932   4 Sheets-Sheet 4

INVENTOR
DAVID HOPPENSTAND
BY
Cook & Robinson
ATTORNEY

Patented Nov. 7, 1933

1,933,908

UNITED STATES PATENT OFFICE 1,933,908

GEAR SHIFTING MECHANISM

David Hoppenstand, Seattle, Wash.

Application March 7, 1932. Serial No. 597,395

8 Claims. (Cl. 74—39)

This invention relates to improvements in gear shifting mechanism and it has reference in particular to mechanism for use in automobiles, trucks and similar motor driven vehicles, for shifting the gears of the speed changing transmission mechanism.

It is the principal object of the invention to provide a manually operated control means for automatically shifting the speed changing gears of the transmission mechanism and which may readily be applied to vehicles already in use, without necessitating any material change or alteration in their existing construction and which in the building of new vehicles may be installed as a part of the steering column assembly.

More specifically stated, the present invention resides in the provision of novel gear shifting mechanism that may be associated with the standard, or common types of speed changing transmission systems, now universally used in automobiles, and which may be operated by the rotative movement of a crank arm or lever adjacent to the steering wheel to effect the proper shifting of gears for any one of the desired speeds. There being, for convenience, a dial associated with the control arm on which are marked the various positions to which the control arm should be adjusted to effect the shifting of gears for any of the speeds possible.

Another object of this invention resides in the special design and use of a compound cam associated with the controlling means of the gear shifting rods.

Other objects of the invention reside in the various details of the construction and combination of parts and in their mode of operation as hereinafter will be fully described.

In accomplishing these and other objects of the invention, I have provided the improved details of construction, the preferred forms of which are illustrated in the accompanying drawings, wherein:—

Figure 6:
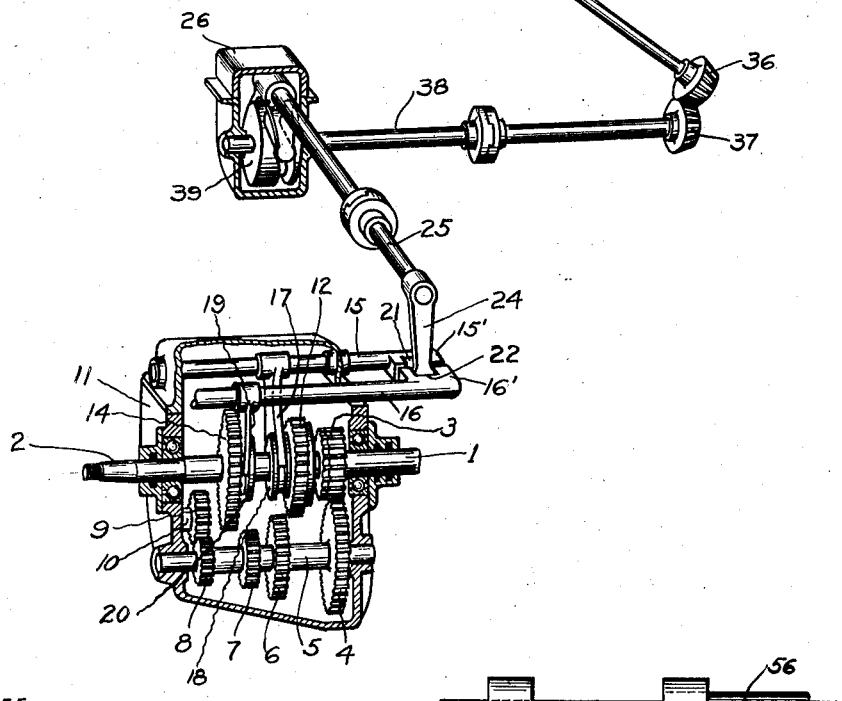
Fig. 6 is a perspective view illustrating an alternative construction of the gear shifting means as applied to a two lever system.
Figure 6:
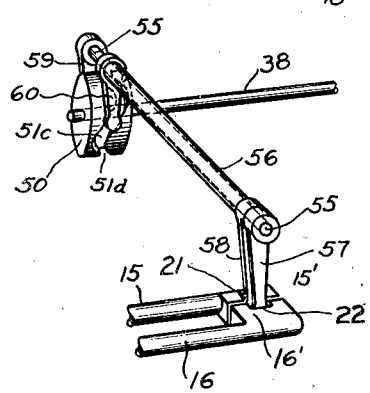
Figure 6A:
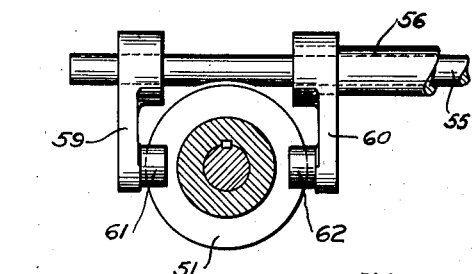
Fig. 6A is a sectional detail of the device of Fig. 6.
Figure 8:
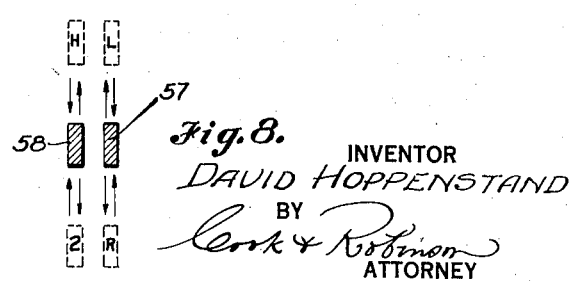

Fig. 8 diagrammatically illustrates the four speed positions and the relative positions of the two shift levers, as used in the construction of Fig. 6, with arrows indicating their direction of movement from one position to another.

Figure 9:
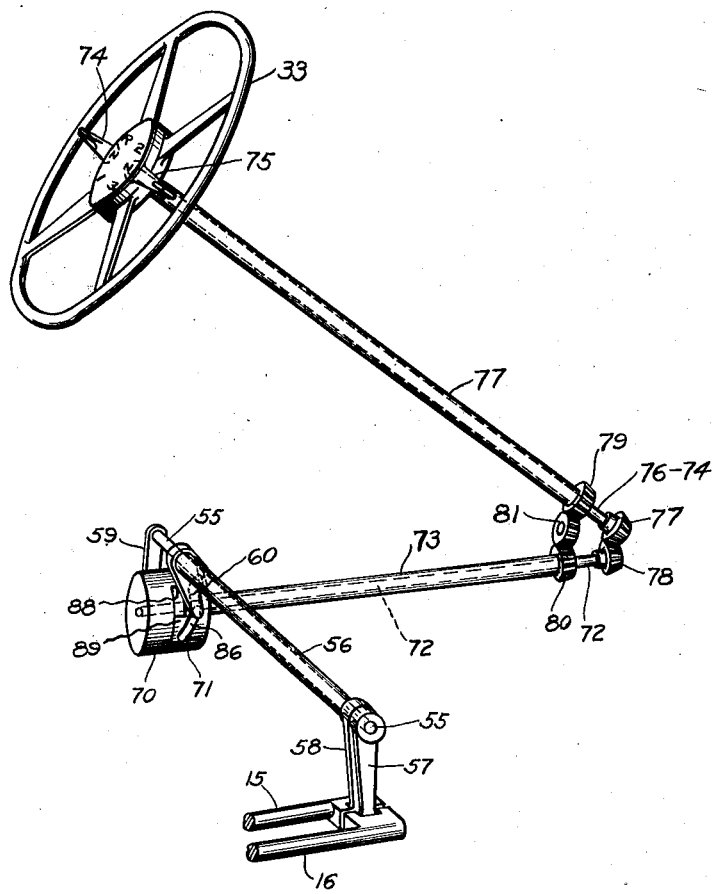

Fig. 9 is a perspective view of an alternative device of a full selective type.

Figures 10, 11:
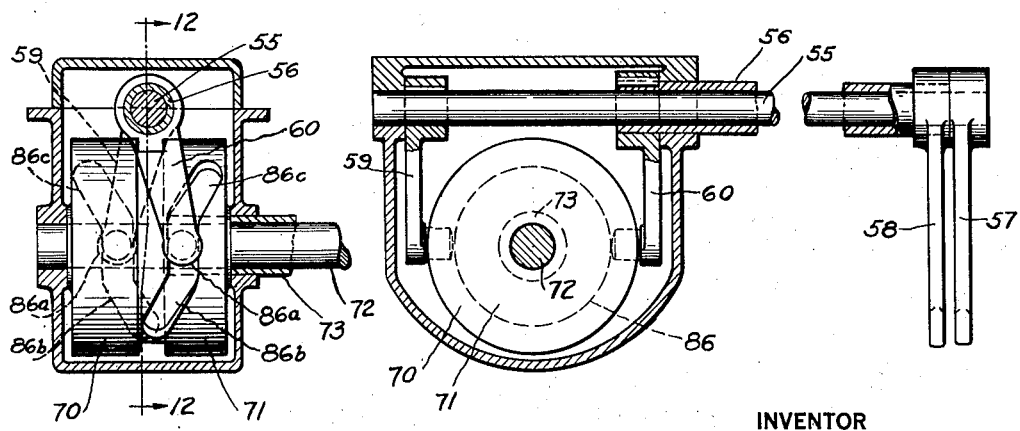

Fig. 10 is a side view of the control cam of the system of Fig. 9.

Fig. 11 is a sectional view through the cam housing transversely of the cam actuating shafts.

Figure 12:
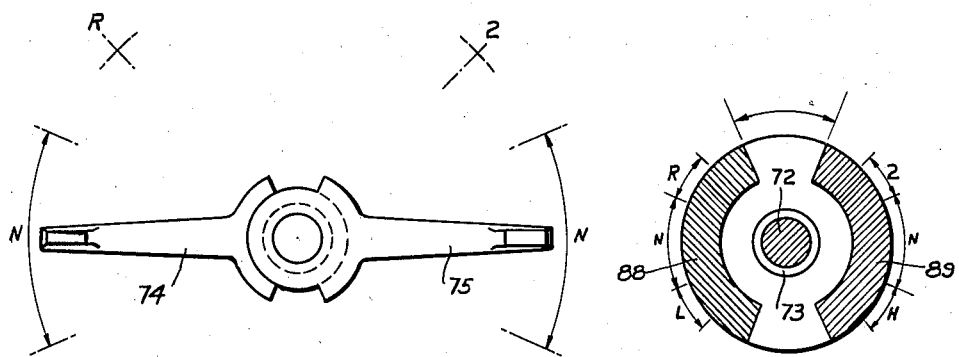

Fig. 12 is a diagrammatic view illustrating relative positions of the speed change or selecting levers and the cams in neutral positions.

Figure 13:
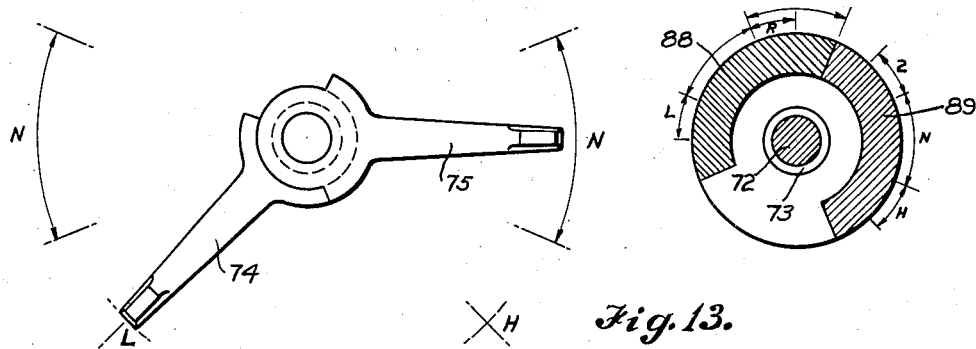

Fig. 13 is a similar view showing relative positions of these parts when adjusted to the low or first speed positions.

Figure 14:
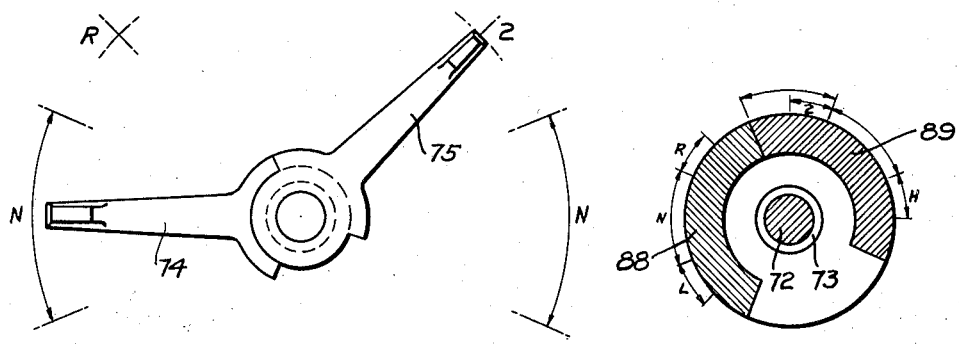

Fig. 14 is a similar view, showing the position of parts for the intermediate speed.

Referring more in detail to the drawings—

Figure 1:
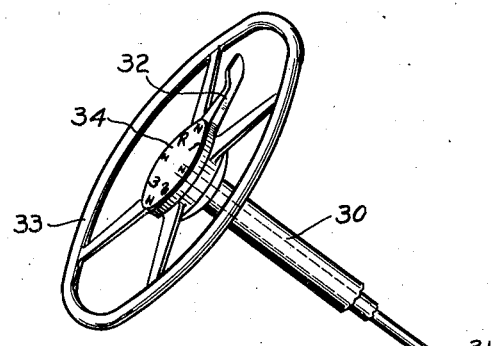
Fig. 1 is a perspective view of a gear shifting mechanism embodied by the present invention; the housings for the cam and transmission gears being broken away or shown in section for the purpose of better illustration.

First briefly describing the speed transmission gear system as seen in Fig. 1 and which is that now universally used in motor driven vehicles using a high, intermediate, and low forward speeds and a reverse speed—1 designates the motor driven shaft, and 2 the transmission shaft arranged for connection with the vehicle driving wheels. When the speed changing gears are in neutral position as seen in Fig. 1, then shaft 1 may revolve freely of shaft 2.

Keyed on the shaft 1 is a gear wheel 3 which meshes with a substantially larger driving gear 4 fixed on a counter shaft 5. Also, on shaft 5, there are spaced apart gear wheels 6, 7 and 8 progressively decreasing in size, the smaller one of which meshes with a slightly larger idler gear 9 mounted by a stub shaft 10 on an end wall of the transmission case or housing 11.

Slidably keyed on the shaft 2 is a gear 12 which may be shifted forwardly from the neutral position in which it is shown and into interlocked connection with the gear 3 thereby to provide a direct driving connection between shafts 1 and 2, or it may be shifted rearwardly from neutral position to mesh with gear 6 so that the vehicle will then be driven from shaft 1 through gears 3, 4, shaft 5, gears 6, 12 and shaft 2 at the second or intermediate speed.

There is also a gear wheel 14 slidably keyed on shaft 2 and adapted to be shifted forwardly from the neutral position shown, into mesh with gear 7 on shaft 5 thus to obtain the low, or first speed drive, which is then transmitted from shaft 1 through gears 3, 4, shaft 5, gears 7—14 and shaft 2. By shifting gear 14 rearwardly from neutral position it will be caused to mesh with the gear 9 and a reverse drive of shaft 2 is the result; the power from shaft 1 then being transmitted through gears 3 and 4, shaft 5, gears 8, 9 and 14 to shaft 2 which through this connection is rotated opposite to the direction of rotation of shaft 1.

The various gears of this transmission system would be proportioned to provide the desired speed changes and are not described in detail since the mechanism within the housing 11 forms no material part of the present invention, except in its combination with the mechanism which actuates or controls it, this latter mechanism which I term the control mechanism, forming the basis of the invention herein claimed.

Figure 3:
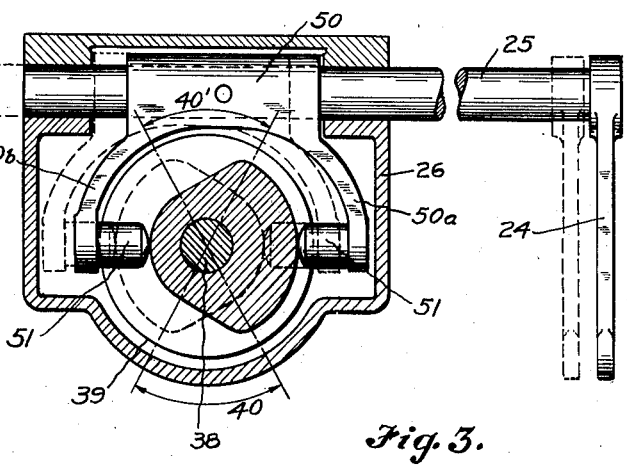
Fig. 3 is a sectional view, taken on the line 3—3 in Fig. 2, particularly illustrating the variation in depth of the cam groove.

The shifting of the gears 12 and 14 is effected, respectively, by the longitudinal shifting of rods 15 and 16 that are slidably mounted in the housing 11 and extend forwardly therefrom. Rod 15 has a yoke arm 17 fixed thereon and operatively engaging a shifting collar 18 on gear 12. Likewise, rod 16 has a yoke arm 19 fixed thereon and operatively engaging a shifting collar 20 on gear 14. At their forward ends the rods 15 and 16 have heads 15' and 16' with side recesses 21 and 22 of like size and facing each other for receiving therein the lower end of a shifting lever arm 24 that is fixed on a gear shifting shaft 25 which extends transversely of the direction of the drive shaft, and is mounted for rotation and also for limited shifting in a longitudinal direction. As seen in Fig. 3, this shaft 25 is rotatably and slidably supported at the end opposite that carrying the crank arm, in the cam housing 26; the latter being mounted in any manner within the vehicle frame, preferably directly below the steering column.

Associated with the steering column 30 of the vehicle which may be of the usual character and in its usual location, is a shaft 31, rotatably mounted and controlled by hand lever 32 fixed thereto at its upper end. When conditions permit it this shaft 31 will terminate concentrically of the usual steering wheel 33 at the upper end of column 30 and a dial plate 34 will be fixed on the column and marked at proper positions and in such way as to indicate tht positions to which the hand lever 32 should be adjusted in order to obtain proper gear positions for a desired speed. The dial as seen in Fig. 1 is marked to indicate the lever positions for first, second, and third forward speeds and the one reverse speed. The positions for the forward speeds being indicated by numerals 1, 2, and 3 and the reverse by R.

At its lower end the shaft 31 is equipped with a bevel gear 36 in mesh with a bevel gear 37, of like size, and fixed on a shaft 38 which extends rearwardly and through the housing 26 below the shaft 25. Within the housing, the shaft 38 has a cam 39 of compound construction fixed thereon, and it is through the rotation of this cam, as controlled by the crank or control arm 32 that the desired longitudinal shifting and rotative action of the shaft 25 is effected for obtaining a desired shifting of the speed changing gears.

Figure 2:
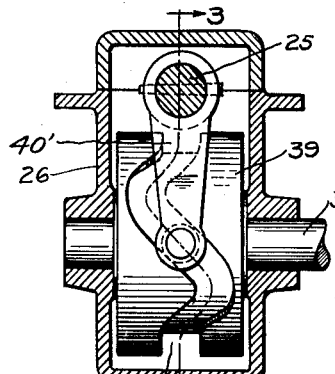
Fig. 2 is a side view of the control cam; the cam housing being shown in cross section.
Figures 4, 4A:
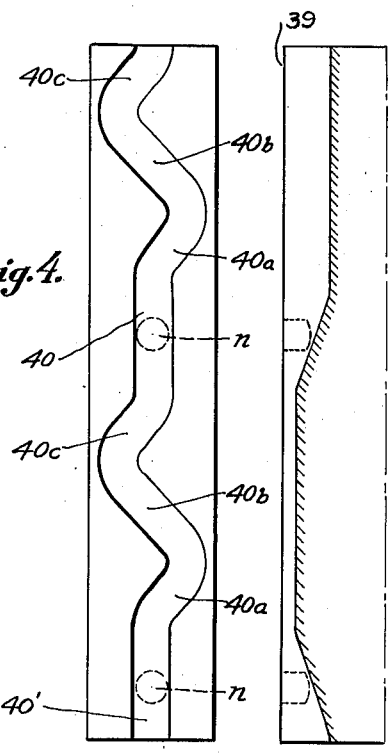
Fig. 4 is a face development of the compound cam.
Fig. 4A is a sectional development longitudinally of the cam groove.

A development of the cam 39 is shown in Figures 4 and 4A. The cam is cylindrical and the groove as seen in Figures 2 and 4 has two straight circumferential portions 40—40' which are located diametrically opposite each other on the cam surface and each extends through an arc of 60 degrees. The ends of these two straight portions of the groove are joined at one side of the cam by a groove of S-shape comprising a portion 40a which leads toward the forward face of the cam, then into a continuing portion 40b that leads back diagonally to near the other face of the cam, then turns back into a part 40c which leads into the end of the other straight portion. Likewise, at the other side of the cam the ends of the straight parts 40—40' are joined by a similar groove of S-shape comprising the parts 40a, 40b, 40c; the complete arrangement being as shown in Figure 2 with the S-shape portions directly opposite each other within the opposite faces of the cam.

The transversely directed shaft 25 extends through the housing 26 above the cam 39 and it has a yoke 50 fixed thereon. The arms 50A and 50b of the yoke depend on opposite sides of the cam 39 and have cam following studs 51—51' fixed thereon operatively disposed within the cam groove. With this arrangement it will be apparent that rotation of the cam will, by virtue of the particular shape of the cam groove, cause the shaft 25 to be rotatably moved, first in one direction and then in the other through an angular distance that is determined by the forward and rearward deviation of the cam groove. This rotative movement of the shaft 25 under control of the cam 39 effects the necessary forward or rearward swinging movement of the shifting lever 24 for actuating the shift rods 15 and 16. However, it is necessary in order to make proper selection of gear shifting rods, that the shaft 25 be adjusted lengthwise a sufficient distance to dispose the end of lever 24 within the head recess of one or the other of these rods to effect its movement while the other remains free. This shifting of the shaft 25 is effected in the following manner—

As seen in Figures 3 and 4A the depth of the cam groove is varied. That portion of the groove within the length of one of the S-shape portions is of one uniform depth while the depth of the other S-shape portion is of greater depth. The straight portions of the cam groove which connect the S-shape portions lead gradually from one depth to the other; the depth arrangement being such that the distances diametrically between base surfaces of the groove at any point are equal. Thus, with the studs of the two yoke arms rounded at their inner ends and in sliding contact with the base of the cam groove at opposite sides of the cam, it is quite apparent that rotation of the cam will cause a back and forth shifting of the shaft 25. With the cam 39 so positioned that the cam followers are medially located in the straight portions 40—40' of the cam groove, or in what I term the neutral positions, as indicated at n—n in Fig. 4, the lever 24 will be in neutral positions both with respect to its swinging action and also its lateral movement. A rotative action of the cam will cause the cam followers to move along the inclined surfaces, thereby to bodily shift the yoke and shaft 25 inwardly or outwardly, thus through the movement of the shaft 25 effected by this particular depth arrangement of the groove, the lever arm 24 will be shifted from its shifting connection from one of the shift rods 15 or 16 into operative connection with the other. Then a continued rotative movement of the cam will cause the cam followers to move into the S-shape portions of the groove thereby to rotate the shaft 25 to swing the lever 24 forwardly or rearwardly according to the direction of rotation of the cam. Thus through the action of the shaft 25 under control of lever 32, the desired speed transmission may be selected.

To facilitate the selection of any speed desired, the dial plate 34, which is associated with the crank 32 is marked at 90° intervals to indicate the positions to which the lever 32 should be adjusted to obtain any of the desired speed transmissions, and adjustment of the various parts is accurately made so that when the lever 32 is at a position between any of these marked locations, the lever 24 will be in a neutral position with respect to its forward or rearward swinging action.

With the device so constructed and with the dial plate 32 marked as shown in Fig. 1, it is quite apparent that by rotation of the lever 32 from the upright neutral position either to the right or to the left, the geared connection 36—37 between shaft 31 and 38 will cause the shaft 38 to be rotated accordingly. Assuming that the shifting lever 32 is in an upright position and that the two cam followers of the yoke are centrally within the S-shape portion of the groove as shown in Figs. 1 and 2 and that the shaft 25 by reason of the cam groove depth arrangement, has been shifted to that extremity of its longitudinal movement that locates the lever 24 within the recess 22 of the head 16' of rod 16, then rotative movement of the lever 32 in a clockwise direction will cause the cam to be rotated to bring the cam followers into the forward extremities of the S-shape portions of the groove, and this will cause the lever 24 to be swung forwardly, thereby shifting the rod 16 forwardly and moving the gear 14 into mesh with gear 7 to secure the first or low speed transmission.

A farther rotative action of the lever 32 carries it through a neutral position and into the intermediate or second speed position. In moving back through the neutral position, the cam followers move back into the straight portions 40—40' of the cam groove, thus the lever 24 shifts the rod 16 to reset the gear 14 in neutral position, then, as the cam followers ride in the straight portions of the groove in passing to the intermediate position the cam 39 causes the shaft 25 to be shifted to its other extreme of longitudinal adjustment, thereby to place the lever 24 in the recess 21' of the head of shifting rod 15, then as the cam followers move again into the ends of the S-shaped parts of the cam groove, the lever 24 swings rearwardly, thereby shifting the rod 15 and moving the gear 12 into mesh with the gear 6 to secure the second or intermediate speed.

Likewise, a continued rotative movement of the lever 32 through the shaft connections rotates the cam to cause the cam followers to pass from one extreme to the other in the S-shaped portions thus causing lever 24 to swing back through neutral position to advance the rod 15 forwardly thus to interlock gears 12 and 3 for a direct or A farther rotative action of the lever 32 beyond the high speed setting, adjusts the parts back through a neutral position to a reverse drive, but in passing through neutral the shaft 25 is again rotated back to neutral position to disengage gears 12 and 3, then is shifted laterally to engage the lever 24 with rod 16, then to swing the arm 24 rearwardly, thus shifting the gear 14 into mesh with gear 9 so that the driving connection is then through the counter shaft 5 and idler gear 9 which reverses the direction of the driving shaft 2. It is to be understood that the usual clutch is to be used between the engine and shaft 1, and that, with this clutch released, shifting may be easily done, and that the lever 32 may be rotated in either direction for this purpose.

Figure 7:
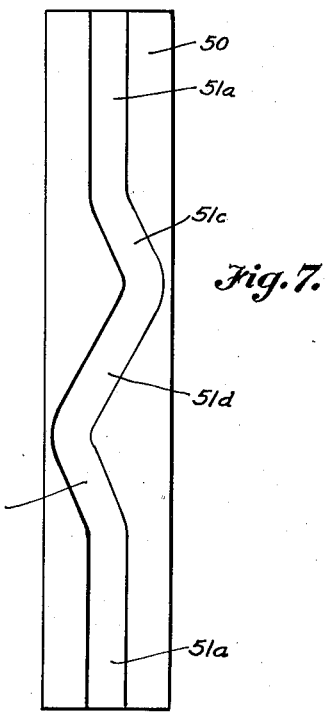
Fig. 7 is a face development of the cam used in this alternative construction.

In the device of Figures 6, 7, and 8, I have illustrated an alternative construction in which separate actuating levers are provided for the shift rods 15 and 16, both of the levers being operated from a single cam 50. The cam 50 has an encircling cam groove 51 of uniform depth and comprising a straight portion 51a extending through an arc of 180 degrees and connected at its ends by an S-shape portion comprising opposite end portions 51b and 51c leading outwardly towards opposite faces of the cam and then connected by a diagonally directed straight portion 51d, as seen in Figure 7. Instead of the shiftable rod 25, as used in the device of Fig. 1, I use a shaft 55 revolubly contained within a sleeve 56. Lever arms 57 and 58 are fixed to the shaft and sleeve, respectively, and at their swinging ends have operative connections, respectively, with the rods 16 and 15. At the inner end of the shaft and sleeve, rocker arms 59 and 60 are fixed, provided with cam followers 61 and 62 extended into the cam groove at opposite sides of the cam. The cam design provides that the straight portion of the cam groove retains one or the other of the arms 57 or 58 in neutral positions while the S-shape of the groove will effect a forward or rearward action of the other arm, thus when this device is associated with the shaft 38 and crank arm 32 as seen in the arrangement of Fig. 1, proper directional rotation of the lever 32 will effect the forward or rearward swinging of one of the levers 57 or 58 while the other lever is held in a neutral position. The preferred operation is to swing the lever arm 32 from upright position, as seen in Fig. 1, in a clockwise direction to control the shifting of rod 15 for high or intermediate speed and its swinging movement in a counter clockwise direction to shift rod 16 for reverse or low speeds. The dial 34, of course, would be marked accordingly.

Figure 5:
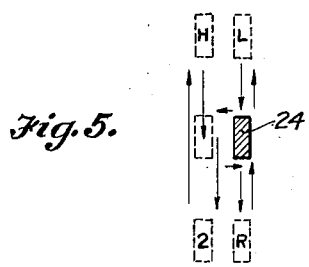
Fig. 5 is a diagrammatic view showing the four positions to which the shifting lever may be adjusted for the various speeds.

The diagrammatic view of Fig. 5 illustrates the four positions to which the shift lever 24 must be adjusted for the various speeds while the diagrammatic view of Fig. 8 illustrates the forward and rearward swinging movement of the two levers as used in the device of Fig. 6, for securing the different speeds.

In Figures 9 to 14, I have illustrated another alternative construction which is fully selective, in that any change from one speed to any other may be made without passing through any intermediate speed position. In this construction I employ two coaxial cams 70 and 71; cam 70 being mounted at one end of a shaft 72 and cam 71 being mounted in facial contact therewith at the end of a tubular sleeve 73 that is revolvable on the shaft 72.

These parts are located in the position of the shaft 38 in Fig. 1, and they are individually controlled by hand levers 74 and 75, respectively; the lever 74 being fixed on a shaft 76 that is coaxial of the steering column while the lever 75 is fixed on a sleeve 77 which encloses the shaft 76. The shafts 76 and 72 are operatively connected by bevel gears 77 and 78 of like size, and the sleeves 77 and 73, likewise, are operatively connected by gears 79 and 80 and an intermediate idler gear 81. The operative connection of these parts is such that rotative movement of either hand lever 74 or 75, will cause a corresponding rotative action of the cam 70 or 71.

The two cams 70 and 71 are of like construction but oppositely arranged and each has a cam slot 86 therein which extends through an arc of 90 degrees. Each slot comprises a straight central portion 86a with outwardly inclined opposite end portions 86b and 86c. As are best seen in Fig. 10, these slots are at opposite sides of the cams when the latter are in their assembled relation.

The two cams are provided on their abutting faces with interconnecting jaws 88 and 89 adapted by rotative adjustment of the cams to be brought into abutment. Each jaw extends only through an arc of 135 degrees, thus, providing a limited freedom of rotative movement of one cam relative to the other.

The arrangement of the transverse shafts in this latter modification of the device, is like that of Fig. 6 wherein the two shifting levers 57 and 58 are provided, respectively, for the rods 16 and 15, and are actuated individually by the transverse shaft 55 and the sleeve 56 which at their inner ends carry the cam actuated arms 59 and 60 provided with followers engaging in this instance within the cam grooves 86. With this arrangement the operation of the device, as diagrammatically illustrated in Figs. 13 and 14 is as follows: First refer to Fig. 12 which shows the control levers on the steering column in neutral position and at the same time the two cams are in neutral position with the cam followers in the straight medial portions. Then assuming that it is desired to shift into low gear, the left hand lever 74 is pulled downwardly as seen in Fig. 13 and this movement of the lever through the gearing and shaft connections provided rotates the cam 70 in such manner that the lever arm 57 shifts the rod 16 to move gear 14 into low speed position. Then, assume that it is desired to shift to intermediate or second speed, the operator simply moves the right hand lever 75 from neutral position up to position shown in Fig. 14. This action of the lever not only causes a rotative action of cam 71 and a resultant movement of rod 15 to effect the shifting of the gears for a second speed, but at the time shifts the rod 16 back to neutral position; this restoring to neutral position of the parts in low speed setting being effected through the interconnection of the two cams. It is observed in Fig. 13 that when the left hand lever is moved to low speed position the jaw 88 of the cam 70 swings to abutment with the jaw 89 of the other cam, then when the cam 71 is rotated by the adjustment of the control lever 75 from neutral to intermediate position, it causes a reverse rotative movement of the first cam and consequently the re-setting of the mechanism. This same operation is carried out for adjustments made for any selected speed. For instance, if the left hand lever 74 is in neutral position, it may be adjusted to low or to reverse positions without effecting the setting of the other lever. Likewise, the right hand lever 75 may be adjusted from neutral setting to high or second speed positions, but if either lever has been moved to either its speed selecting position, an adjustment of the opposite lever from neutral to either of its speed selecting positions will bring the first lever back to neutral position.

Devices of this character provide for a convenient, easily operated, positive and visible selection of speeds. For vehicles already in existence, it would be practical to install this type of control system parallel with and closely adjacent to the steering column so that the control levers would be easily accessible to the hands of the driver. In the construction of new vehicles it would be preferred that the shaft which mount the control levers, be incorporated within the steering column.

It is to be understood that details of construction might be varied without departing from the spirit of the invention, and therefore, it is not desired that the claims shall be limited to the details shown, but that they be given an interpretation commensurate with the scope of the invention disclosed.

Having thus described my invention, what I claim as new therein and desire to secure by Letters Patent is.

1. The combination with a change speed transmission mechanism including a longitudinally adjustable gear shifting rod, of a control therefor comprising a cross shaft, an arm fixed thereon and operatively engaging the said rod, a cam having a circumferentially extending slot with oppositely directed opposite end portions, an arm fixed to the shaft provided with a follower extending into the cam slot and manually adjustable means for rotating the cam to effect rotative action of the cross shaft and an adjustment of the gear shifting rod in accordance with the direction of rotation of the cam.

2. The combination with a change speed transmission mechanism including a pair of gear shifting rods that are longitudinally movable in opposite directions from neutral position, of a control means therefor comprising a longitudinally movable and rotatable shaft, a lever arm fixed thereon and selectively engageable, by longitudinal adjustment of the shaft, with one or the other of said rods, a cam, a follower fixed to the shaft and operatively engaging the cam, a manually adjustable means for rotating the cam to effect longitudinal shifting of the cross shaft and a rotative movement thereof for effecting movement of a gear shifting rod.

3. The combination with a change speed transmission mechanism including a pair of gear shifting rods that are longitudinally movable in opposite directions from neutral position, of a control means therefor comprising a cross shaft mounted for longitudinal shifting and rotatable in opposite directions from neutral position, a lever arm fixed to the shaft and selectively engageable, by longitudinal adjustment of the shaft, with one or the other of said rods, a compound cam, a yoke fixed to the shaft and embracing the cam, a manual control for rotating the cam thereby to effect longitudinal adjustment of the cross shaft and its rotative movement for selectively operating either of the gear shifting rods.

4. In combination, a change speed transmission mechanism including a pair of gear shifting rods that are longitudinally movable in opposite directions from neutral position and provided with recesses in adjacent faces thereof that register when said rods are in neutral position and a control mechanism comprising a longitudinally movable and rotatable cross shaft, a lever arm fixed to and adapted to be disposed, by longitudinal adjustment of the shaft in opposite directions within one or the other of said rod recesses, a cam, a cam yoke fixed to the cross shaft, and a control comprising means for rotating the cam; said cam being designed to effect longitudinal adjustment of the cross shaft through said yoke to move the lever arm while in neutral position from operative connection with one rod into operative connection with the other, then to effect rotative movement of the shaft to shift the rod engaged in opposite directions in accordance with the direction and rotation of the cam.

5. The combination with a motor vehicle of the character described having a steering column, and a change speed transmission mechanism including a pair of gear shifting rods that are longitudinally adjustable in opposite directions from neutral position and provided with recesses in adjacent faces thereof which register when said rods are in neutral position, of a control mechanism comprising a longitudinally and rotatably movable cross shaft, a lever arm fixed to the shaft and adapted, by longitudinal adjustment thereof in opposite directions, to be selectively positioned within one or the other of said rod recesses for actuation of the rod, a cam, a cam yoke on the cross shaft, and a cam rotating means including a lever supported by the steering column, and rotatable in opposite directions to rotate the cam accordingly; said cam being designed to effect, through said yoke, longitudinal shifting of the cross shaft in opposite directions from neutral position, in accordance with direction of rotation of the cam, then to effect a rotative movement of the shaft for shifting the rod then engaged by the lever arm in accordance with the direction of rotation of the cam.

6. The combination with a change speed transmission mechanism including a pair of gear shifting rods that are longitudinally movable in opposite directions from neutral position, of a control means therefor comprising a rotatable shaft, a sleeve rotatable thereon, lever arms fixed on the sleeve and shaft and operatively engaging said rods respectively, a cam, rocker arms fixed to the sleeve and shaft and operatively engaging the cam, and manual means for rotating the cam; said cam being so designed that rotation in one direction from neutral position effects actuation of the said shaft and rotation in the other direction effects actuation of the sleeve.

7. The combination with a change speed mechanism including a pair of rods that are shiftable in opposite directions from a neutral position, of a control mechanism comprising a rotatable cross shaft, a sleeve rotatable on the shaft, lever arms fixed to the sleeve and to the shaft and operatively engaging the rods, a pair of cams, manual means for selectively rotating the cams, and means individually connecting the cams with the cross shaft and sleeve for rotating them in opposite directions in accordance with rotation of the cams.

8. The combination with a change speed mechanism including a pair of rods that are shiftable in opposite directions from a neutral position, of a control mechanism comprising a rotatable cross shaft, a sleeve rotatable on the shaft, lever arms fixed to the sleeve and to the shaft and operatively engaging the rods, a pair of cams, levers selectively movable from neutral position in opposite directions for individually actuating the cams, means individually connecting the cams with the cross shaft and sleeve for rotating them in opposite directions in accordance with direction of rotation of the cams; said cams having a lost motion connection whereby movement of one cam from neutral position will return the other cam and its control lever to neutral position.

DAVID HOPPENSTAND.